May 14, 1946.　　　L. S. WILLIAMS　　　2,400,277
INDICATING MECHANISM
Filed Oct. 24, 1942　　　4 Sheets-Sheet 1
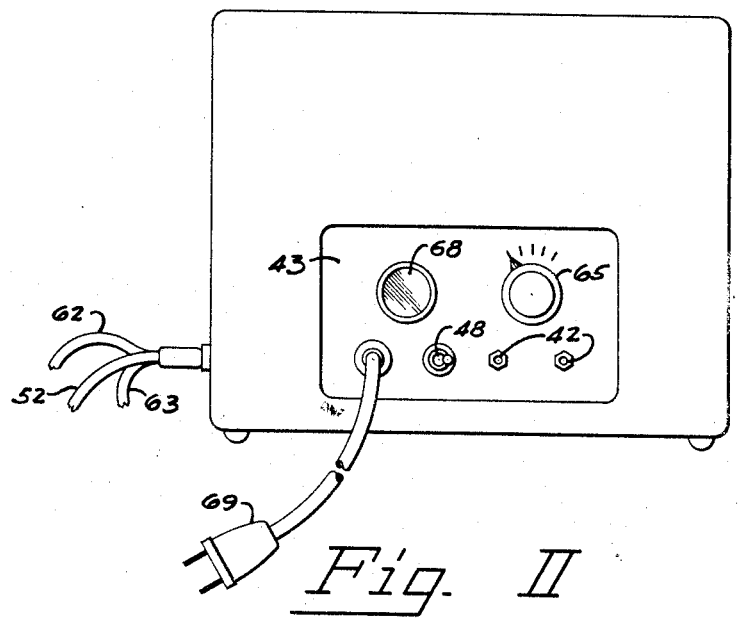
Fig. II
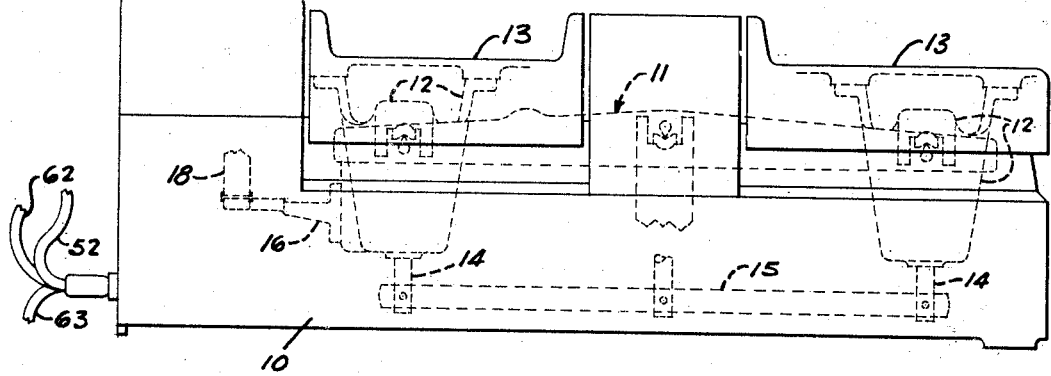
Fig. I
INVENTOR.
Lawrence S. Williams
BY
Marshall & Marshall
ATTORNEYS.

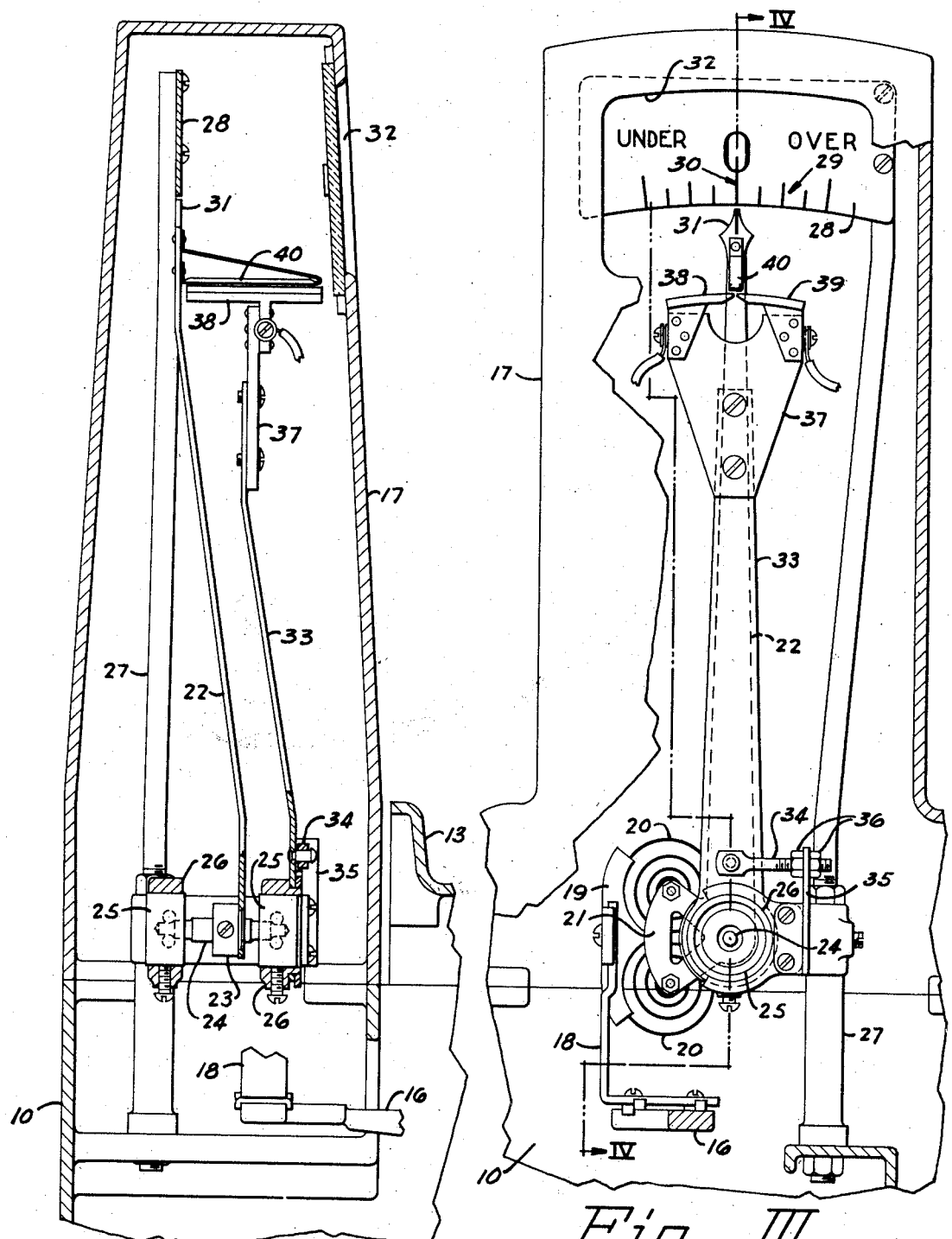

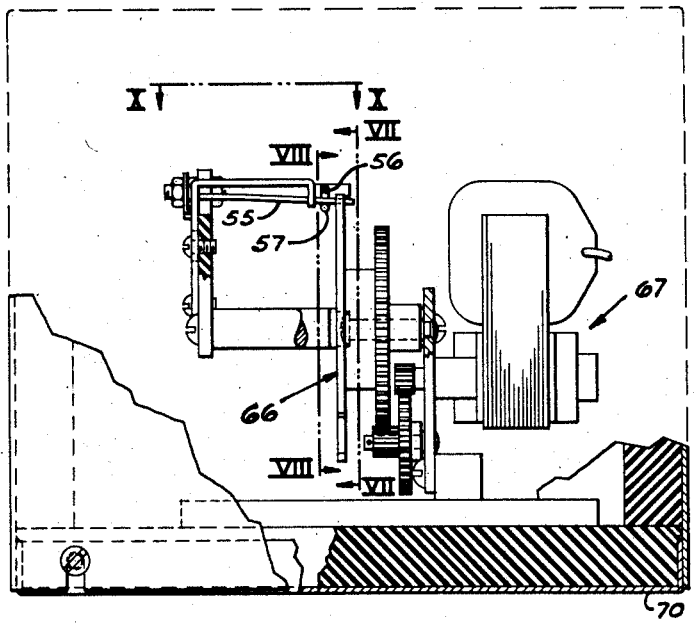
Fig. V
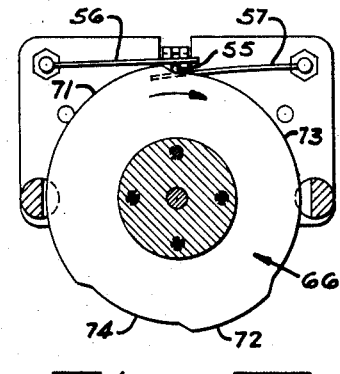
Fig. VII
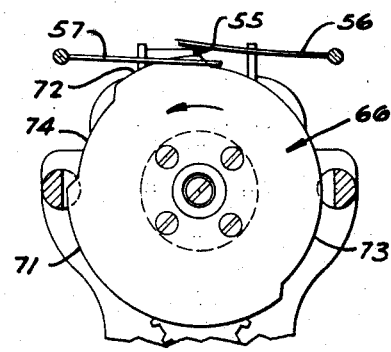
Fig. VIII
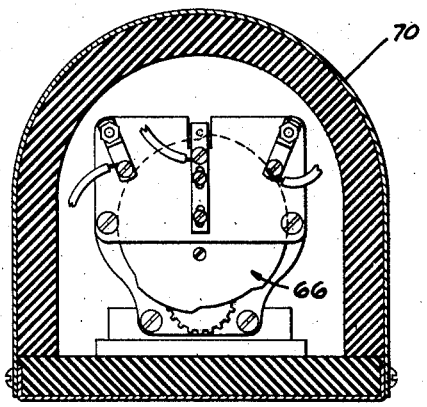
Fig. VI
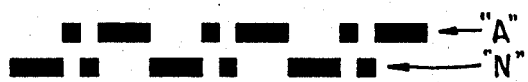
Fig. IX
INVENTOR.
Lawrence S. Williams
BY
Marshall & Marshall
ATTORNEYS.

May 14, 1946.        L. S. WILLIAMS        2,400,277
INDICATING MECHANISM
Filed Oct. 24, 1942        4 Sheets-Sheet 4
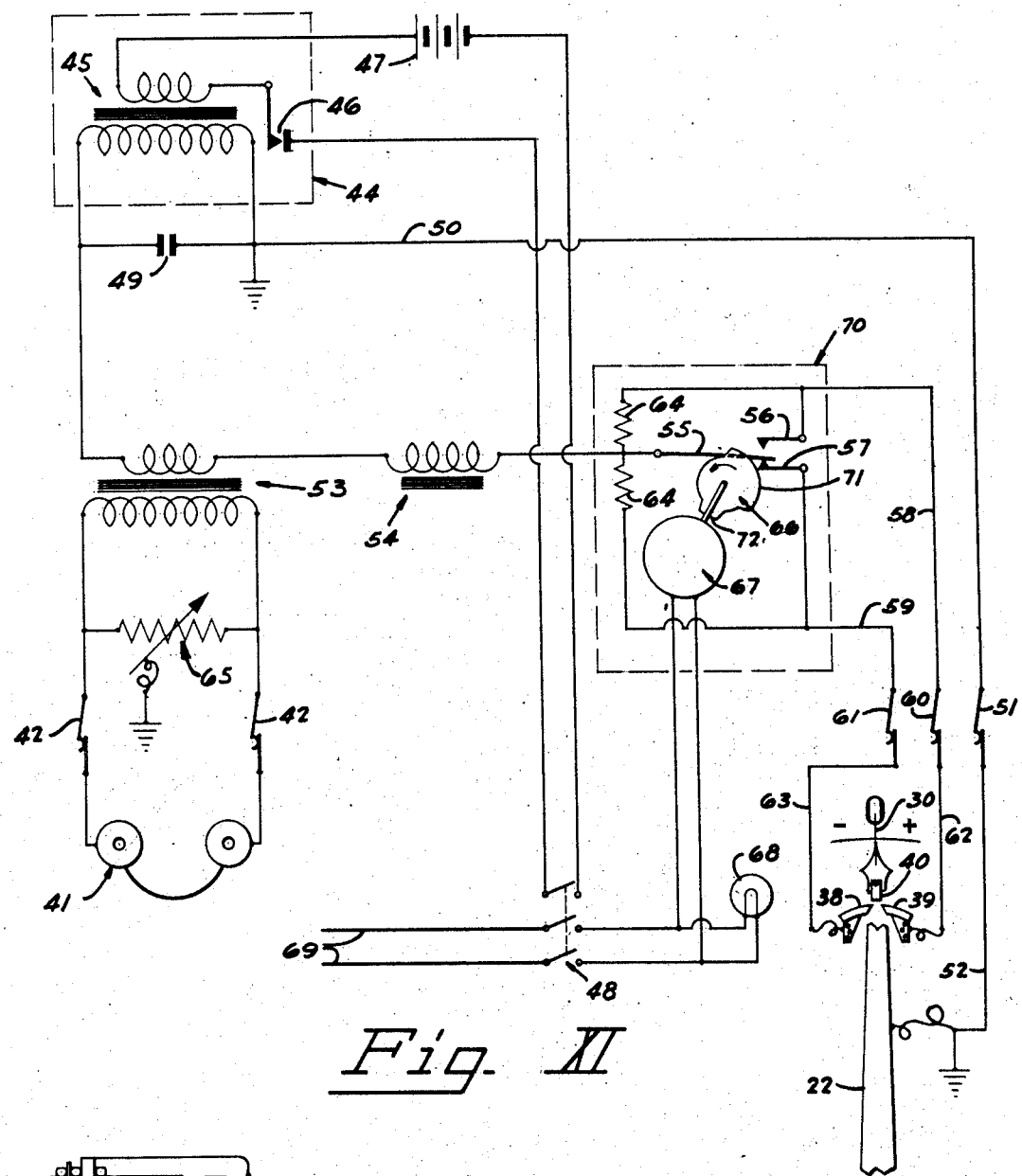
Fig. II
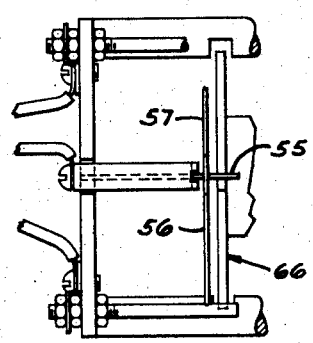
Fig. I
INVENTOR.
Lawrence S. Williams
BY
Marshall & Marshall
ATTORNEYS.

Patented May 14, 1946

2,400,277

UNITED STATES PATENT OFFICE 2,400,277

INDICATING MECHANISM

Lawrence S. Williams, Toledo, Ohio, assignor to Toledo Scale Company, Toledo, Ohio, a corporation of New Jersey Application October 24, 1942, Serial No. 463,265

2 Claims. (Cl. 177—311)

This invention relates to indicating mechanisms for use with instruments which must be brought to or maintained at a correct position and which have a range of positions both above and below, or on each side of the correct position, in which the operation employing the instrument also requires the concentrated attention of the operator to the operation so that it is impossible for him to view or watch a visual indicator.

In many delicate operations in industry, such as for example, the weighing of minute quantities of liquids or compounds, there is required the full attention of the operator to the operation itself. In general such operations have been carried out on delicate weighing scales where close attention is required to the indicator in order to reach an accurate result. This requirement of close attention has generally been a function of the operator's eyesight, and thus the amount of close attention which the operator could give had to be divided between watching the indicator and the operation itself.

Similarly many other operations, such as gun sighting, close tolerance machine tool operation and the operation of electrical equipment at closely specified points, require the undivided attention of the operator to other variables in the operation than the instruments themselves. Working under these conditions is rendered even more difficult when, as is often the case, the operator's position in order to carry out the operation does not permit him to view the instrument, or the light available is inadequate to permit him to read the instrument.

Delicate operations of the nature above specified, due to the necessity of the use of the eye in reading the instrument indicators, has prevented any of such work being done by sightless operators. It has, therefore, been impossible to employ blind people in any of the many simple weighing, controlling or operating positions in which, due to the use of controlling instruments, eyesight has been essential.

It is an object of this invention to provide an indicating mechanism for a measuring or indicating instrument which will enable accurate and fast operations employing such instrument by sightless operators and by "sighted" operators under conditions such as total darkness which preclude visible indication.

It is a further object of this invention to provide an indicating mechanism which will permit operators engaging in delicate operations requiring their full and undistracted attention, and in particular the attention of their eyes, to devote their entire attention, and will indicate approach to and arrival at a desired exact position of the instrument with which it is employed by means of the sense of hearing.

It is a further object of this invention to provide a delicate weighing scale for the weighing of specified quantities of materials in which the operation of weighing itself requires the full visual attention of the operator which will indicate the approach to and arrival at the desired weight by means of an audible indication rather than a visual indication.

It is a still further object of this invention to provide a weighing scale enabling accurate and fast weighments by blind operators.

More specific objects and advantages are apparent from the description, in which reference is had to the accompanying drawings illustrating a preferred form of scale embodying the invention.

In the drawings:

Fig. I is a view, in elevation, of a weighing scale adapted to be employed with indicating mechanism embodying the invention, certain parts being shown in dotted lines.

Fig. II is a view, in elevation, of a control box and instrument panel adapted to be employed with the scale embodying the invention.

Fig. III is a fragmentary view of the indicating mechanism of the weighing scale shown in Fig. I.

Fig. IV is a vertical sectional view, taken substantially on the line IV—IV of Fig. III.

Fig. V is a fragmentary view of signal generating means.

Fig. VI is a view taken from the left side of Fig. V but on a smaller scale.

Fig. VII is a detailed view showing signal creating mechanism, taken substantially on the line VII—VII of Fig. V.

Fig. VIII is a detailed view, in elevation, of the mechanism shown in Fig. VII but taken from the position shown by the line VIII—VIII in Fig. V.

Fig. IX is an illustration of the interlocking nature of the signals generated by the mechanism shown in Fig. V.

Fig. X is a fragmentary plan view, taken substantially on the line X—X of Fig. V.

Fig. XI is a schematic wiring diagram of electrical apparatus employed with an indicating mechanism embodying the invention.

These specific drawings and the specific description that follows merely disclose and illustrate the invention and are not intended to impose limitations upon the claims.

A weighing scale adapted to be employed with indicating mechanism embodying the invention comprises a base 10 in which is pivotally mounted an even-armed lever 11 on each end of which there is supported a platter spider 12. On the upper surface of each of the spiders 12 there is located a load-receiving platter 13, and extending downwardly from each of the spiders 12 is a boss 14, which bosses are connected by a check link 15. A bracket 16, secured to one of the spiders 12, extends beneath the end of an indication tower 17 erected on the base 10 at one end thereof. To the innermost end of the bracket 16 there is secured an angle plate 18, to the upper end of which is attached a yoke 19. A pair of spiral springs 20 are each connected at their outermost ends to the yoke 19 and at their innermost ends to a triangularly-shaped arm 21 of an indicator 22 secured to a hub 23 which is mounted on an indicator shaft 24 journaled in ball bearings 25. The bearings 25 are held in a pair of bearing retainers 26 which are secured on a mounting post 27 mounted within and extending upwardly inside of the indication tower 17. At the uppermost end of the post 27 there is mounted a short arcuate chart 28 on which is scribed a series of "under" and "over" indicia 29 and a zero indicium 30. The arcuate lower edge of the chart 28 is closely adjacent the line of movement of a pointer 31 of the indicator 22 with which the indicia 29 cooperates for visually indicating the condition of balance existing between the material on the two platters 13. (On one of which a weight usually is placed, the substance to be weighed being placed on the other.) The chart 28 and pointer 31 are visible through a windowed opening 32 in the front wall of the indication tower 17.

An arm 33, which is mounted at its lower end on the front one of the bearing retainers 26, is angularly movable through a slight angle by means of a link 34 which is riveted to the arm 33 and has a threaded end extending through a positioning plate 35 on each side of which there is located an adjusting nut 36. On the upper end of the arm 33 there is secured a bracket 37, of non-conducting material, on which are mounted two condenser plates 38 and 39. The condenser plates 38 and 39 are formed substantially in the shape of sections of the wall of a hollow cylinder and have a radius of curvature slightly smaller than the radius of curvature described by the movement of a smaller condenser plate 40 which is mounted on the indicator 22 and which moves along above the condenser plates 38 and 39.

Because of the slight difference in radii, as the indicator 22 moves away from its balance position (its centrally located position as shown in Fig. III), the air gap between the condenser plate 40 and that one of the plates 38 or 39, over which the plate 40 is moving, increases, thus decreasing the capacity of the condenser.

Audible indications of approach to, and arrival at, a condition of balance, are appreciable in a pair of earphones 41 (Fig. XI) which are connectable into a pair of earphone jacks 42 located on the exterior of the instrument panel 43, as shown in Fig. II. The audible indication of the operation of the scale consists of a series of dots and dashes which are generated in the electrical mechanism of the device and audible in the earphones 41. These dots and dashes are graphically shown in Fig. IX and comprise a dot-dash combination forming the letter "A" of the Morse code when the scale is below or under the balance condition, and a dash-dot, or the letter "N" of the Morse code, when the scale is above or over balance condition. The tone of which these signals are formed is created in a "hummer" 44 of standard commercial type, which comprises a transformer 45 and carbon button microphone 46 energized by a source of direct current 47 when a main switch 48 of the device is closed. One lead from the secondary coil of the transformer 45 has a common connection to ground and to one side of a condenser 49, which is shunted between the output leads of the transformer 45, and also to a lead 50. The lead 50 is connected to a jack 51 into which a lead 52 from the main scale housing is connectable. The lead 52 is connected to the ground and to the indicator 22 and thus to the condenser plate 40 mounted on the indicator 22. The other side of the output of the secondary coil of the transformer 45 is connected to one side of the primary of an earphone coupling transformer 53 which is in series with a choke coil 54, the other side of which is connected to a wire feeler 55. The feeler 55 is engageable with either of a pair of contacts 56 and 57 which are connected through leads 58 and 59, jacks 60 and 61 and leads 62 and 63 in the main scale housing, to the two condenser plates 39 and 38, respectively. A small resistance 64 is shunted around each of the contacts 56 and 57. The secondary coil of the earphone coupling transformer 53 has a grounded resistance 65 shunted between those leads which are connected to the two phone jacks 42.

The "hummer" current, which is created by the "hummer" 44, thus flows through the primary of the transformer 53, the choke coil 54 and the feeler 55 whence it is divided between the contacts 56 and 57, and consequently the condenser plates 39 and 38, respectively, by means of a cam 66 (Figs. VII and VIII) which moves the feeler 55 alternately into contact with the contacts 56 and 57, being rotated at constant speed by a geared motor 67. The motor 67 is wired in parallelism with an "on and off" lamp 68 to the main switch 48 and an outside power source 69. The motor 67, its gearing, the frame for the cam 66, and the feeler and contacts 55, 56 and 57, are located within a soundproof housing 70 to prevent the clicking sound of the feeler 55, engaging with the contacts 56 and 57, from disturbing the operator.

The cam 66 rotates in the direction of the arrows in Figs. VII, VIII and XI, and has two raised surfaces 71 and 72 which are engaged with the feeler 55 in that order. The raised surface 71 corresponds to a dash in the Morse code and is engaged with the feeler 55 to force the feeler against the contact 56 for a length of time corresponding to the duration of a dash in the Morse system. The raised surface 72 similarly causes a signal lasting throughout the length of time occupied by a dot in the Morse system. The raised surfaces 71 and 72 are separated by two depressed surfaces 73 and 74 which by passing beneath the feeler 55 in that order permit it to drop and make the contact 57. The low surface 73 has a circumferential length substantially equal to that of the raised surface 71, and the low surface 74 is substantially equal in length to the raised surface 72. The two surfaces 73 and 74 thus permit the feeler 55 to engage the contact 57 for periods of time corresponding to a dash and a dot, in that order, in the Morse system. As can be seen by comparing Figs. VIII and IX (reading from the left in Fig. IX and starting the cam 66 from the position shown in Fig. VIII), the relationship is thus: When the surface 71 contacts the feeler 55 it causes the first dash at the left of Fig. IX. The surface 74 breaks contact between the feeler 55 and contact 56 and establishes contact between the feeler 55 and the contact 57, forming the first dot in the upper row of Fig. IX and the space between the dash and first dot in the lower row of Fig. IX. Similarly, the raised contact 72 forms the space between the first dot and first dash in the upper line and forms the first dot in the lower line. Continued rotation of the cam 66 at constant speed thus creates intermeshed "N" and "A" signals which are each sent over one of the two branches of the circuit connected to the condenser plates 39 and 38 respectively.

Thus there are proceeding through the branch of the circuit leading to the condenser plate 38 a series of "N" signals. When the indicator 22 is at the left, and thus the scale is below its balance position, the condenser formed by the common plate 40 and the condenser plate 38 is in position to permit the "A" signal to flow across between the plates to the ground and the lead 52, through the jack 51 and the lead 50 back to the "hummer" transformer 45, this circuit being coupled by the transformer 53 the signal is audible in the earphones 41. As the scale approaches zero and the indicator 22 swings to the right, due to the differences in the radii of the condenser plate 38 and the condenser plate 40, the capacity of the condenser formed thereby increases and thus the volume of the "A" signal increases as the scale approaches zero. When a condition of balance is realized, and the common plate 40 is located equidistantly between the two plates 38 and 39 (as shown in Figs. III and XI), the capacities of the two condensers formed by the common plate 40 and the plate 38, and the common plate 40 and the plate 39, are equal, and thus both the "A" signal and the "N" signal are transmitted through the circuit and, since they are intermeshed by the action of the cam, a continuous loud tone is audible in the earphones 41. When the pointer moves to the right of its central position, the capacity of the condenser formed by the common plate 40 and the plate 39 increases, and the dash-dot "N" signal becomes increasingly audible until the indicator has moved some slight distance to the right and the condenser plate 40 is positioned over only the condenser plate 39. At this point a loud "N" signal is audible on the earphones 41. Thereafter as the indicator moves further to the right, the capacity of the condenser decreases due to the disparity in radii and the "N" signal decreases in volume.

Thus the signal audible, i. e., whether an "N" or an "A," indicates whether the scale is above or below balance and consequently whether the load being weighed is larger or smaller than the desired load and the change in volume from a less audible signal and a more audible signal (or vice versa) indicates approach to (or movement away from) a balance condition. The balance condition is indicated by a change from the "A" signal if weight has been added, or a change from the "N" signal if the weight was originally too great and some of it has been removed, to a single continuous tone.

By changing the values of the various resistances and condensers, and by changing the size of the condenser plates, the sensitivity of the audible indicating means may be varied at will.

It is to be understood that the audible indicating means herein disclosed is not limited in its application to weighing scale operation. Any other instrument or device in the operation of which a predetermined setting must be made under conditions of poor light, inaccessible view or in which other variables require the undistracted attention of the operator, may be equipped with the herein disclosed audio indicating means. These instruments, for example, may be navigation compasses, gun-sighting apparatus, machine tool indicators, tachometers, electrical meters, and pressure gauges and meters of varied forms and purposes.

The embodiment of the invention that has been disclosed may be modified to meet various requirements.

Having described the invention, I claim:

1. Indicating mechanism for a condition-responsive instrument having a certain norm comprising, in combination, a condition-responsive element actuated by changes of the condition under measurement by said instrument, a condenser plate mounted on said condition-responsive element, a member positionable adjacent the path of said condenser plate for establishing such norm, a pair of condenser plates mounted on said member, one on each side of the central norm position, said pair of condenser plates being shaped so as to be slightly more distant from the path of said common condenser plate at their far ends than at their near ends, and electrical apparatus including a device for creating two electrical signals of different characteristics, an electrical circuit leading to said device and having two parallel branches therebeyond, a different one of said signals being transmitted through each of said branches, a different one of said pair of condenser plates being located in each of said branches, said common condenser plate being located in said main circuit, and means for rendering audible said electrical signals, whereby the position of said condition-responsive element relative to such norm is indicated by that one of said signals which is audible and approach to such norm is indicated by increased volume of said signal.

2. In a weighing scale, in combination, weighing mechanism including a load receiver and an indicator movable in response to loads applied to said load receiver, means for audibly indicating the condition of balance of said weighing mechanism, said means comprising an electrical device for creating two signals of different characteristics, two circuits from said device one for each signal each including an impedance element adjacent the path of said indicator, a common element on said indicator, and means for rendering the signals passed through said impedance elements audible, said impedance elements being characterized by presenting a high impedance to the flow of signal current when the indicator is remote from a selected balance point, said impedance decreasing as said balance point is approached and sharply increasing as said balance point is passed, whereby an audible signal of one characteristic apparent with an unbalance increases in amplitude as balance is approached, merges with the signal of the other characteristic at balance, and sharply decreases in amplitude when the balance point is passed.

LAWRENCE S. WILLIAMS.